3,180,790
TRITHIOCARBONATES AS NEMATOCIDES
Lyle D. Goodhue, Bartlesville, Okla., assignor to Phillips
 Petroleum Company, a corporation of Delaware
No Drawing. Filed Dec. 1, 1952, Ser. No. 323,509
20 Claims. (Cl. 167—22)

This invention relates to a method for rendering soils nematocidal in character. In one aspect this invention relates to nematocidal compositions comprising a class of trithiocarbonates. In another aspect this invention relates to the preparation of nematocides.

Nematodes are a class of unsegmented roundworms belonging to the phylum Nemathelminthes. Certain forms, mainly belonging to the genera Heterodera and Anguillulina (Tylenchus), are parasites which attack the roots, stems, leaves, or ears of cultivated plants of various kinds and may cause deterioration or substantially complete loss of the crop. Thus means for eradication or adequate control of these pests is much to be desired.

We have now discovered that trithiocarbonates are highly effective materials for treating soil for the control of harmful nematodes found therein. These compounds are characterized by the formula

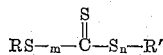

wherein R and R' are radicals selected from the group consisting of alkyl and substituted alkyl groups containing not more than 5 carbon atoms, and $m$ and $n$ are each integers selected from the group consisting of 1, 2 and 3. Typical trithiocarbonates applicable to use in the present invention include:

S-tert-butyl-S'-tert-butyl trithiocarbonate,
S-methyl-S'-tert-butyl trithiocarbonate,
S-ethyl-S'-tert-butyl trithiocarbonate,
S-tert-butylsulphenyl-S'-tert-butyl-sulphenyl trithiocarbonate,
S-ethyl-S'-tert-butylsulphenyl trithiocarbonate,
S-tert-butyl-S'-tert-butylsulphenyl trithiocarbonate,
S-ethyl-S'-tert-butylthiosulphenyl trithiocarbonate,
S-tert-butyl-S'-tert-butylthiosulphenyl trithiocarbonate
and the like.

These trithiocarbonates can be produced by any desired method. One such preparative method is set forth in the U.S. Patent 2,574,457 to P. M. Arnold, in accordance with which a trithiocarbonate represented by the above structural formula is prepared by the interaction of an alkali metal trithiocarbonate

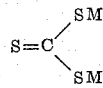

with a sulfenyl halide RSX; M, X and R, respectively, representing an alkali metal, a halogen and an alkyl radical. Another such preparative method is set forth in U.S. Patent 2,574,829 to C. M. Himel and L. O. Edmonds, in accordance with which a trithiocarbonate represented by the structural formula

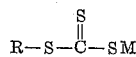

is reacted with a sulfenyl halide $RS_mX$; R, M, $m$, and X representing respectively an alkyl group, alkali metal, an integer of 1 or 2, and a halogen. Both these preparative methods are conducted at room temperature or somewhat higher temperature, and in the presence of an inert solvent.

The compounds used in the present invention are usually employed for their intended purposes as suspensions, as for example aqueous emulsion, or as solutions in suitable solvents which do not have deleterious effects on these compounds and which do not leave appreciable amounts of toxic residues in the soil. Suitable solvents include selected iso-paraffinic hydrocarbon fractions known commercially as Soltrols, i.e. straight-chain hydrocarbons, containing preferably, not more than 12 carbon atoms in a molecule, naphthas, kerosene and the like. The preferred solvents employed in the preparation of such solutions applicable to use in the present invention boil in a temperature range of from 150 to 450° F., preferably from 200 to 300° F.

Solutions or suspensions, particularly aqueous emulsions prepared according to the manner of the present invention, contain the trithiocarbonate component in a concentration generally from 1 to 50 weight percent, preferably from 5 to 25 weight percent. However, when employing water, it is often advantageous to employ a saturated water solution which contains considerably less than 1 weight percent active ingredient. These solutions or suspensions are applied to the soil in an amount to provide from about 10 to about 60 pounds of active trithiocarbonate ingredient per acre. However, when treating soil containing undecomposed plant material infested with galls of root-knot nematodes, it is frequently favorable to use a sufficient amount of solution to provide as much as 75–80 pounds of active ingredient per acre. However, it is to be understood that the invention is not limited by these ranges, i.e., 10–80 pounds per acre, since local conditions, such as nematode activity, soil temperature, the condition of the group being treated, and other factors present at the time of application, may require dosages outside these limits.

Aqueous emulsions of the trithiocarbonates, employed in accordance with the present invention, are advantageously employed where it is desirable to drench soils such as in greenhouse benches and the like.

The nematocides of the present invention are particularly applicable to destruction of the root-knot nematodes, *Heterodera marioni*, *Rhabditis strongyloids*, Panagrellus and others.

Fumigation of soil using the trithiocarbonates disclosed hereinabove can be carried out in a number of ways. For example, measured amounts of the trithiocarbonate fumigant to be applied can be injected at regular intervals beneath the surface of the soil either by automatic machinery or by hand operated apparatus known in the art. These materials are usually deposited at a depth of from 3 to 8 inches below the surface of the soil depending on the character, moisture content, temperature, and other properties of the soil at from 8-inch to 12-inch intervals, although in some instances intervals as great as 15 inches may be used if desired.

Our invention is illustrated by way of the following examples.

*Example I*

Tests were conducted wherein candidate nematocides of the present invention were made up as 2 weight percent aqueous emulsions using 0.5 weight percent Atlox 1045A (polyoxy ethylene sorbitol oleate-laurate emulsifying agent) as emulsifier. Preliminary tests showed that Atlox 1045A was non-toxic to the test organism. These 2 percent emulsions were then diluted to form emulsions of four different concentrations, namely 2.0, 0.2, 0.02 and 0.002 weight percent.

One milliliter of distilled water was placed in an 8 mm. by 76 mm. test tube and from 25 to 50 nematodes of the species *Rhabditis strongyloids* were then transferred to the test tube. To 1 ml. of water in the test tube containing the nematodes, 1 ml. of one of the concentrations of a candidate nematocide, prepared as described above, was added. This procedure was repeated for the three other concentrations of the compounds.

Since this was a 50–50 dilution, the final concentrations of the compounds were 1.0, 0.1, 0.01 and 0.001 percent. Each test tube was stoppered and agitated mechanically for a period of 2 hours and then a mortality count was made. Results are recorded in the following table:

| Nematocide | Percentage Mortality at Indicated Emulsion Concentration | | | |
|---|---|---|---|---|
| | 1.0% | 0.1% | 0.01% | 0.001% |
| S-tert-butyl-S'-tert-butylsulfenyl trithiocarbonate | 40 | 20 | 0 | 0 |
| S-tert-butyl-S'-tert-butylthiosulfenyl trithiocarbonate | 100 | 10 | 0 | 0 |
| S-tert-butylsulfenyl-S'-tert-butylsulfenyl trithiocarbonate | 8 | 0 | 0 | 0 |
| S-ethyl-S'-tert-butylthiosulfenyl trithiocarbonate | 98 | 94 | 1 | 0 |
| S-ethyl-S'-tert-butylsulfenyl trithiocarbonate | 5 | 2 | 0 | 0 |

*Example II*

Tests were also conducted wherein candidate nematocides of the present invention were made up as saturated aqueous solutions (considerably less than 1 weight percent). The compounds were placed in water, agitated, allowed to settle and the aqueous phase decanted and employed in the following test.

Twenty-five to fifty nematodes of the species *Rhabditis strongyloids* were placed in an 8 mm. by 76 mm. test tube containing 2 ml. of the saturated aqueous solution. The test tubes were then stoppered and agitated mechanically for a period of 2 hours. The nematodes were then removed from the test tubes and placed in watch glasses and observed at hourly intervals. Results are recorded below:

Compound: Percentage mortality using saturated aqueous solution
    S - tert - butyl - S' - tert - butylthiosulfenyl trithiocarbonate ___ 100% in 4 hours.
    S - ethyl - S' - tert - butyl - thiosulfenyl trithiocarbonate _____ 100% in 4 hours.

Variation and modification are possible within the scope of the foregoing disclosure and the appended claims to the invention, the essence of which is that trithiocarbonates as described have been found to be nematocidal in character, and that nematocidal compositions containing the same have been set forth and described.

I claim:
1. A nematocidal composition including an inert adjuvant as a carrier for the nematocide and containing as an essential active ingredient a compound having the formula:

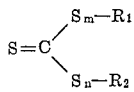

where $R_1$ and $R_2$ are alkyl radicals having from 1 to 4 carbon atoms and $m$ and $n$ are each an integer in the range of 1 to 3, inclusive.

2. The method of combating nematodes comprising applying to nematode infested soil a compound have the formula:

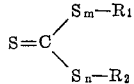

where $R_1$ and $R_2$ are alkyl radicals having from 1 to 4 carbon atoms and $m$ and $n$ are each an integer in the range 1 to 3, inclusive.

3. A method of rendering soil nematocidal in character which comprises innoculating said soil with a trithiocarbonate having the following structural formula

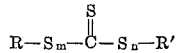

wherein R and R' are alkyl radicals containing not more than 5 carbon atoms and $m$ and $n$ are each an integer in the range 1 to 3, inclusive.

4. A nematocidal composition including an inert adjuvant as a carrier for the nematocide and containing as an essential active ingredient a compound having the formula:

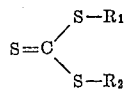

wherein $R_1$ and $R_2$ are the same alkyl radicals having from one to three carbon atoms.

5. The method of combating nematodes comprising applying to nematode infested soil a compound having the formula:

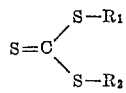

wherein $R_1$ and $R_2$ are the same alkyl radicals, each having from one to three carbon atoms.

6. The nematocidal composition of claim 1 wherein said trithiocarbonate is S-tert-butyl-S'-tert-butylsulfenyl trithiocarbonate.

7. The nematocidal composition of claim 1 wherein said trithiocarbonate is S-tert-butyl-S'-tert-butylthiosulfenyl trithiocarbonate.

8. The nematocidal composition of claim 1 wherein said trithiocarbonate is S-tert-butylsulfenyl-S'-tert-butylsulfenyl trithiocarbonate.

9. The nematocidal composition of claim 1 wherein said trithiocarbonate is S-ethyl-S'-tert-butylthiosulfenyl trithiocarbonate.

10. A nematocidal composition of claim 1 wherein said trithiocarbonate is S - ethyl - S' - tert - butylsulfenyl trithiocarbonate.

11. The method of claim 3 wherein said trithiocarbonate is S-tert-butyl-S'-tert-butylsulfenyl trithiocarbonate.

12. The method of claim 3 wherein said trithiocarbonate is S-tert-butyl-S'-tert-butylthiosulfenyl trithiocarbonate.

13. The method of claim 3 wherein said trithiocarbonate is S-tert-butyl-sulfenyl-S'-tert-butylsulfenyl trithiocarbonate.

14. The method of claim 3 wherein said trithiocarbonate is S-ethyl-S'-tert-butylthiosulfenyl trithiocarbonate.

15. The method of claim 3 wherein said trithiocarbonate is S-ethyl-S'-tert-butylsulfenyl trithiocarbonate.

16. The method of claim 3 wherein said trithiocarbonate is dissolved in a liquid nematocidal adjuvant solvent carrier in a concentration not exceeding about 50 weight percent.

17. The method of claim 16 wherein said trithiocarbonate is dispersed in an aqueous emulsion containing said trithiocarbonate, water and an emulsifying agent.

18. The method of claim 16 wherein said liquid nematocidal adjuvant solvent carrier is a hydrocarbon fraction of straight-chain hydrocarbons containing not more than 12 carbon atoms in the molecule.

19. The method of claim 18 wherein the boiling range of said solvent is from 150–450° F.

20. The method of claim 3 wherein said trithiocarbonate is applied to a soil area in proportions in the range of from 10 to 80 pounds per acre.

(References on following page)

References Cited by the Examiner

UNITED STATES PATENTS

| | | | |
|---|---|---|---|
| 2,574,457 | 11/51 | Arnold | 260—545 |
| 2,574,829 | 11/51 | Himel et al. | 260—545 |
| 2,621,143 | 12/52 | Goodhue et al. | 167—22 |
| 2,676,129 | 4/54 | Bashour | 167—22 |
| 2,701,224 | 2/55 | Stansbury et al. | 167—22 |

FOREIGN PATENTS

| | | |
|---|---|---|
| 485,059 | 10/29 | Germany. |

OTHER REFERENCES

Roark: U.S. Dept. of Agric. Bulletin No. 162, March 1929, pp. 1–3 and 33.

Frear, D.E.H.: Chemistry of Insecticides, Fungicides and Herbicides, 2d, edition September 1948, pp. 108–122.

Frear: Chem. of Insecticides, Fungicides and Herbicides, 2d edition, 1948, D. Van Nostrand Company, Incorporated, New York city, pages 189 to 195.

LEWIS GOTTS, *Primary Examiner*.

W. B. KNIGHT, D. ARNOLD, M. O. WOLK, JULIAN S. LEVITT, *Examiners*.